United States Patent [19]

Sharpless et al.

[11] Patent Number: 5,421,128

[45] Date of Patent: Jun. 6, 1995

[54] CURVED, INFLATED, TUBULAR BEAM

[76] Inventors: Garrett C. Sharpless, 9 Wood Rd., Sherborn, Mass. 01770; Glen J. Brown, 458 Thayer Rd., Santa Cruz, Calif. 95060

[21] Appl. No.: 181,024

[22] Filed: Jan. 14, 1994

[51] Int. Cl.⁶ .............................................. F04G 11/04
[52] U.S. Cl. ...................................... 52/2.13; 52/2.18; 52/88
[58] Field of Search ....................... 52/2.11, 2.13, 2.18, 52/2.21, 86, 88; 152/453

[56]  References Cited

U.S. PATENT DOCUMENTS

| | | | |
|---|---|---|---|
| 4,279,285 | 7/1981 | Grawey | 152/453 |
| 4,585,044 | 4/1986 | Carreara et al. | 152/453 |
| 5,205,086 | 4/1993 | Heim | 52/2.18 X |

Primary Examiner—Carl D. Friedman
Assistant Examiner—Christopher-Todd Kent
Attorney, Agent, or Firm—Price, Frank C.

[57] ABSTRACT

A curved, inflated, tubular beam consists of braided fibers and axial fibers on an elastomeric barrier. The construction can be accomplished on a short, straight mandrel. The curvature along the beam can be varied to suit the design needs. The angle of the braid in the bias fibers determines the inflated curvature when axial fibers situated within the braid along the inside of the curvature constrain the elongation on the inside of the curvature. The curved shape can be reinforced by having tape cemented to the outside of the inflated tube. While very small and very large tubes can be perfected for a range of inflation pressures and beam strengths, the preferred embodiment is a 12 ¾-inch diameter tube, 60 feet long forming an arch for a tent 30 feet wide and 24 feet high.

8 Claims, 4 Drawing Sheets

CURVED, INFLATED, TUBULAR BEAM

BRIEF SUMMARY OF THE INVENTION

1. Field of the Invention

This invention applies to structural support elements which are tubes of flexible material inflated to develop their rigidity. They consist of fibers for strength and elastomeric material to contain the inflation medium. Such an inflatable tube is especially useful where light weight is an advantage and where compact storage of the uninflated item is desired.

Inflatable, arched beams are used in rapidly deployable shelters. The advantages over conventional, rigid, structural elements are a reduced time and less labor being required to erect the shelter plus a lower total weight for transportation.

Inflatable beams are also used for spars in deployable wings. Wings with an arch, such as parafoils and paragliders, require curved spars. The advantages of using an internally-pressured structure to support the wing, compared to ram-air inflation of the entire wing, are a reduced line count and an improved structural stability on high aspect-ratio wings. The benefits are increased performance and improved safety.

2. Description of the Related Art

The current method of construction of inflated, curved, tubular beams involves the manufacture of beams having the same arched or curved shape as is desired in the final part at the time of the fabrication. The fabrication can also include the use of coated fabrics which are cut, laid-up, and fabricated to the desired shape by stitching, adhesive bonding or thermally welding fabric pieces together. Another method is to braid fibers directly onto a curved mandrel duplicating the desired shape of the final part. With this method the axial fibers fill the full circumference of the tube and fix the shape of the tube. The fibers braided on a bias angle are set at a very high angle to the axis. They contribute primarily to hoop strength. A given mandrel size and shape is required for a given, specific curved beam or arch.

A curved mandrel poses special problems in the positioning and traversing of the mandrel with respect to the braiding machine. It can be difficult, if not impossible, to remove the part from the mandrel. Also, the mandrel sweeps through a large amount of floor space. These difficulties are greatest for the very large arched beams that are parts for large shelters. A technique is needed to reduce the size of floor area required for the braiding of the beam fibers and to allow changes in shape without involving complete substitution of large mandrels.

Low-pressure fabric beams are known. Arches are formed in these by darts or seams. Such beams are typically inflated to 3 to 6 psi. They have very limited capability for large shelters.

Tubular weaving is known, as is the method for pulling unequal lengths of warp yarn to produce curved tubes. The difficulty in maintaining consistent tension in the fill yarns where the yarns change directions to the opposite layer of the weave has prevented beams made in this way from achieving more than a small fraction of their design burst strength. Failure modes have been sudden and explosive.

Two-dimensional and three-dimensional braiding of curved beams on curved mandrels is known. Arched beams of small size have been produced by this method. The difficulty and cost of producing and manipulating very large curved mandrels is a severe limitation of this method of construction.

SUMMARY OF THE INVENTION

The present invention is a curved, inflated, tubular beam which gets its curvature, variable or constant along its length, upon inflation as determined by the arrangement of the fibers comprising its outer surface. This arrangement of fibers includes bias fibers applied by a braiding method and axial fibers interwoven with the braid, applied over only a fraction of the tube's circumference. The bias fibers are applied at an angle that would cause the tube to elongate upon inflation, were the axial fibers not present. Because the axial fibers are present on only one side of the tube, and constrain that side of the tube to a fixed length, the tube curves upon inflation instead of elongating. The degree of curvature can be closely controlled, and optionally varied along the length of the tube, by controlling the angle of the bias fibers. This design of fiber arrangement can be manufactured economically by braiding onto a straight mandrel. The bias angle can be accurately controlled by controlling the mandrel traverse rate in proportion to the speed of the braider.

The completed beam consists of a tube of thin elastomeric film over which the fibers are braided. The elastomeric tube is placed over the mandrel, then an adhesive is applied to the tube just prior to applying the braid. The elastomeric tube serves the dual purposes of stabilizing the fiber arrangement and of providing an inflation gas barrier. Optionally, the braided fibers can be impregnated with an elastomeric solution that forms the gas barrier after curing. Also, optionally, the fibers can be impregnated with a solution that forms a tough outer surface after curing.

The strength and number of fibers in the braid are engineered to be adequate for the intended pressure in the inflated tube. Additionally, the braid is loaded with longitudinal (axial) fibers or yarn over a portion of the circumference on the inside of the intended curvature. In coordination with the bias angle of the braided fibers, the longitudinal fibers are tensioned upon inflation, maintaining the desired curvature.

Optionally, fibers in tape or other form can be applied longitudinally to the outside of the curvature of an inflated, curved beam as described above. The addition of longitudinal fibers opposite the axial fibers included in the braid increases the bending stiffness of the beam for those applications where this is needed.

The fibers which give burst-resisting strength to the tube are braided in a design which determines the curvature of a braided tube. The principle governing the curve formation is that a braided tube of bias angle greater than 54.7 deg. will grow in length (and shrink in diameter) as it is pressurized until the elongation reduces the bias angle to 54.7 deg, at which point no further elongation will occur with additional pressure. With the inextensible fibers added to one side of the braid, the tube tends to bend instead of elongating.

The radius of curvature R is determined by the trellising of the fibers which allows the surface of the outside of the curve to elongate an amount e (dimensionless, e.g. inches per inch). Where d is the diameter of the tube, the radius of curvature of the tube is determined by
}

$d/R = e$

With no loading of axial fibers, thus a balanced braid, the bias angle determines the elongation of the surface on the outside of the curve. The amount of elongation, while depending primarily on the bias angle, depends also on the elasticity of the liner and other factors. The amount of elongation increases approximately in proportion to the amount that the bias angle exceeds 54.7 degrees.

This discussion outlines the principles of how the curve is developed. It is also possible to express these principles in terms of equations that are useful for engineering. However, since the liner elasticity and other factors also affect curvature, in practice, short sections are constructed to verify each braid design.

The axial fibers are placed over less than 60 degrees of the tube circumference. Too wide a "stripe" results in non-uniform loading of stress within the fibers, i.e., stress concentration at the edges of the strip.

With the same braider and mandrel setup one can vary the final shape of the beam by controlling the braid bias angle. A bias angle of 54.7 deg. will produce a straight beam. Higher bias angles produce curvature that is progressively tighter as the bias angle increases. Thus, bias angle can be varied over the length of the finished beam.

The single disadvantage in the above-described curved beam construction is that the stiffness against bending is less than that for a beam made on a curved mandrel with a full axial braid. Where this weakness might be critical, it can be overcome by the bonding along the outside surface of the curve of a tape made of high modulus textile material, while the beam is inflated and curved to the design shape.

DESCRIPTION OF THE PREFERRED EMBODIMENT

Figure 6:
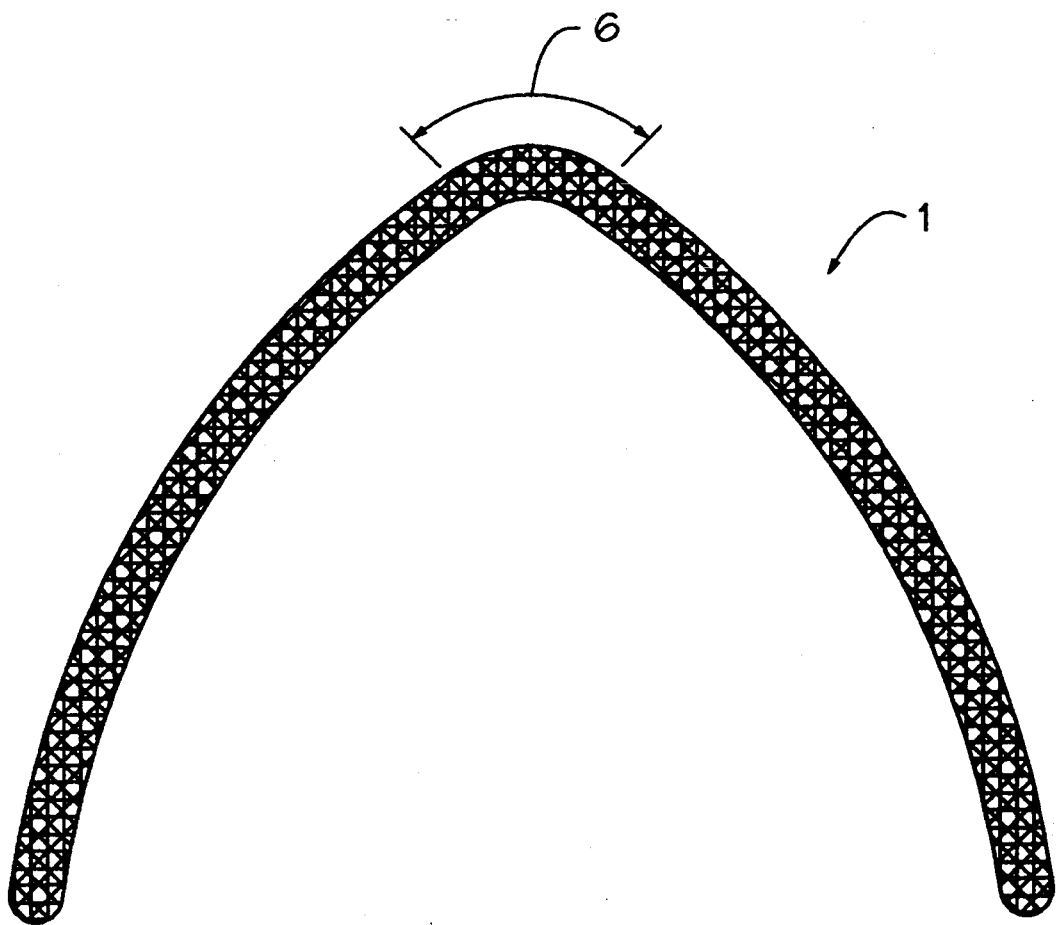
FIG. 6 shows an arch made of an inflated tube, the curvatures having been created by the fiber layout.

While an almost unlimited combination of tube diameters, curvatures and pressures are possible in curved, inflated, tubular beams, the preferred embodiment is presented in FIG. 6 as a tube 1 of 12 ¾ inches diameter and 60-foot length configured as an inflated arch functioning as a supporting element for a large tent having an interior width of 30 feet and height of 24 feet. Other embodiments of the concept could apply to other sizes of arch, to flying wing structures and to any structure where an inflatable, tubular element is of use. This particular design is inflated to 50 psi. The ends and the valving for inflation are not indicated. Any number of means of valving the gas and of sealing the ends of the beam are possible.

Figure 1:
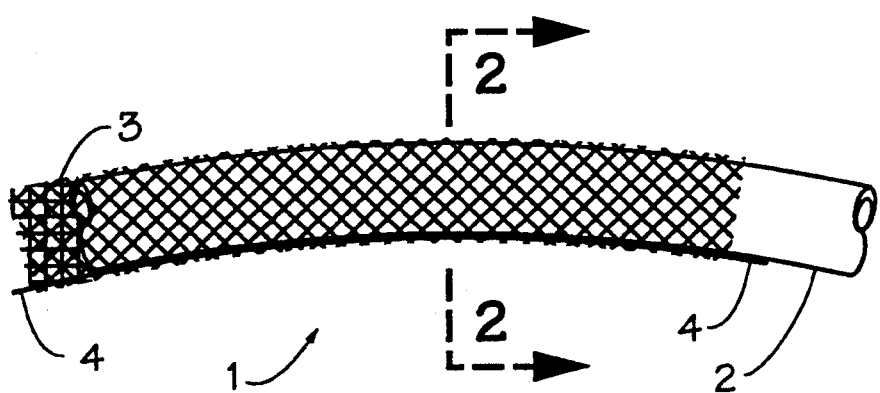
FIG. 1 shows a length of curved, inflated tube indicating the arrangement of the fibers along the tube.

As seen in FIG. 1, a length of the elastomeric tube 1, a portion of the inflated tubular arch of FIG. 6, is made of a Urethane film 2 of 0.010 inch thickness. The braided bias fibers 3 are 1140 denier Kevlar 49 yarn with a tensile strength of approximately 55 pounds each, there being eleven ends on each of 144 carriers. The axial fibers 4 are two plies of 7100 denier Kevlar 49, each having a strength of approximately 688 pounds. The axial fibers 4 are distributed over eight inches of the circumference in 15 braid locations. Their total strength is 10,320 pounds. (Sufficient strength to support the tube fully buckled at 100 psi.)

The bias fibers 3 are braided at an angle of 57 degrees over the full length of the beam 1, except for an 18-inch section, the peak of the arch, 6 in FIG. 6, in the center which is braided at 62 degrees, a high bias angle. The peak of the arch 6, the center section, in FIG. 6, with the high bias angle causes the tight curvature that forms the peak of the arch 6. The axial fibers 4 extend uniformly throughout the length of the tube, supporting the curvature as controlled by the braid bias angle.

Figure 2:
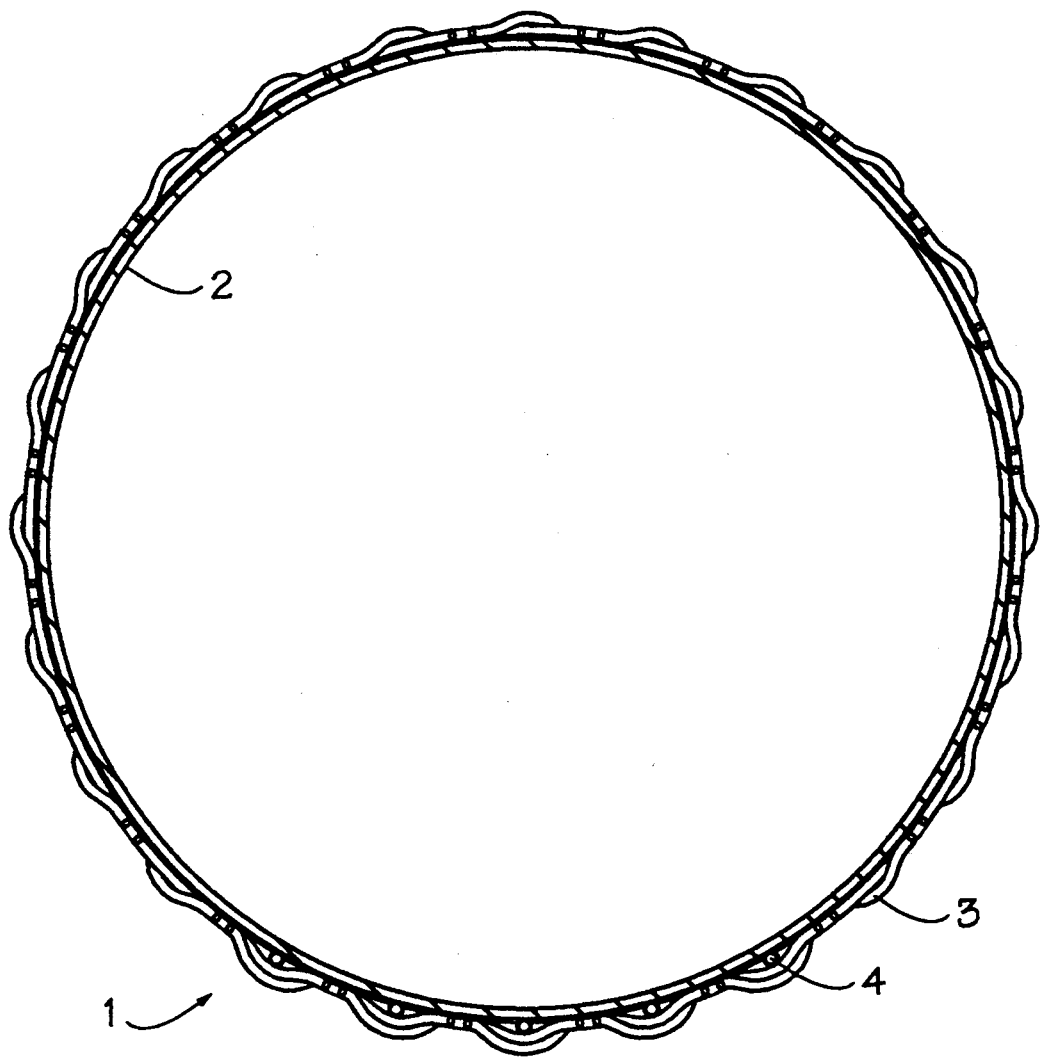
FIG. 2 shows a cross section of the tube of FIG. 1.

FIG. 2 shows a cross section of the inflated tube 1. The elastomeric inner layer 2 is covered with the reinforcing fibers, the bias braid 3 and the axial fibers 4. Elastomeric can also be deposited within all of the fibers surrounding the inner layer 2 as a way of protecting them and keeping them in place. The deposited elastomer can be made tough enough such that it, instead of the inner tube, can function as the gas barrier.

Figure 3:
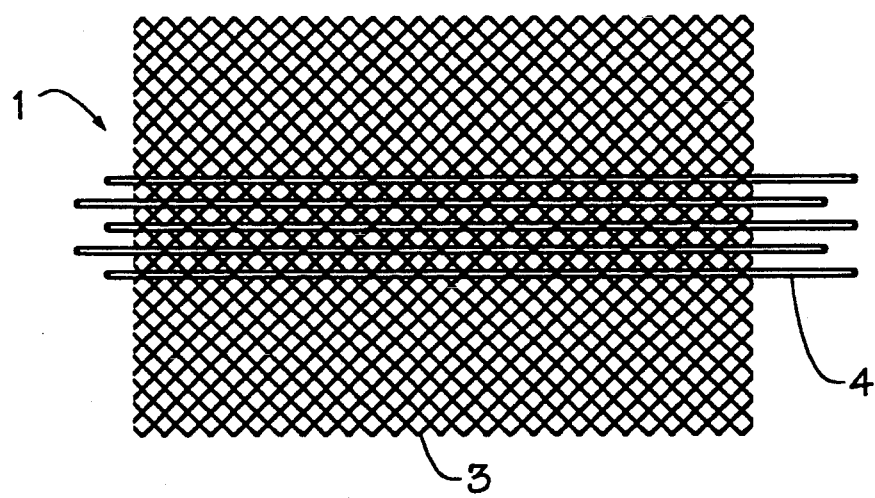
FIG. 3 shows a portion of the tube of FIG. 1 with the surface laid out flat after the tube has been slit along its length. This shows the fibers as they were braided on the straight mandrel before inflation.

FIG. 3 clarifies the orientation of the fibers by showing a view where the tube 1 has been split parallel to the axis along the outside of the tube's curve and the tube 1 has been laid open. Thus, the braided fibers 3 are seen with the axial fibers 4 interwoven through the central area of the braided fibers 3.

Figure 4:
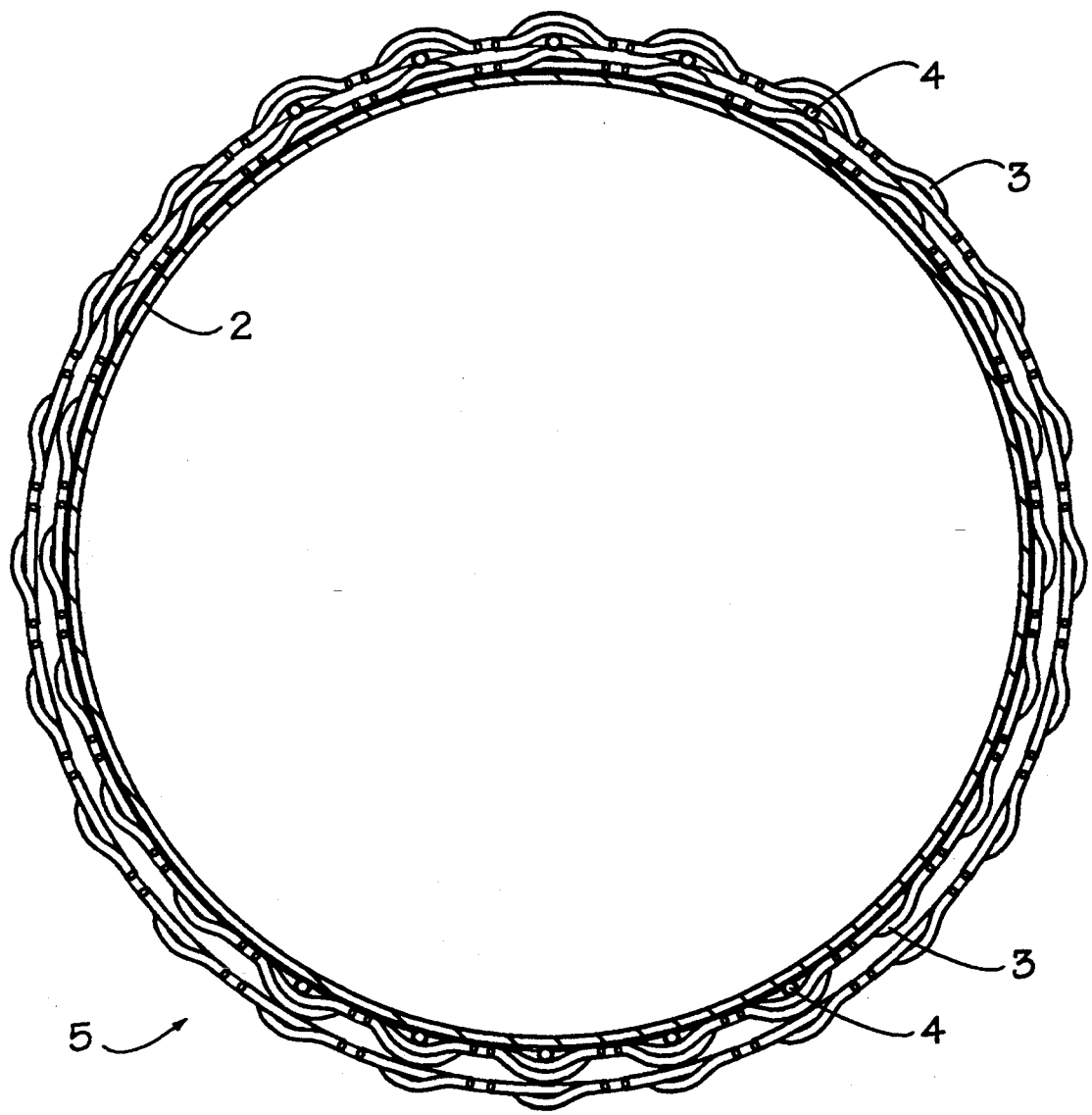
FIG. 4 shows a cross section of a tube with a second layer of fibers providing extra stiffness.

FIG. 4 shows the cross section of an inflated, curved tube 5 with its elastomeric inner tube 2 with a second layer of axial fibers 4 and braided fibers 3 for added stiffness. The outer braid layer is bonded to the tube only after the tube is inflated to its design shape.

Figure 5:
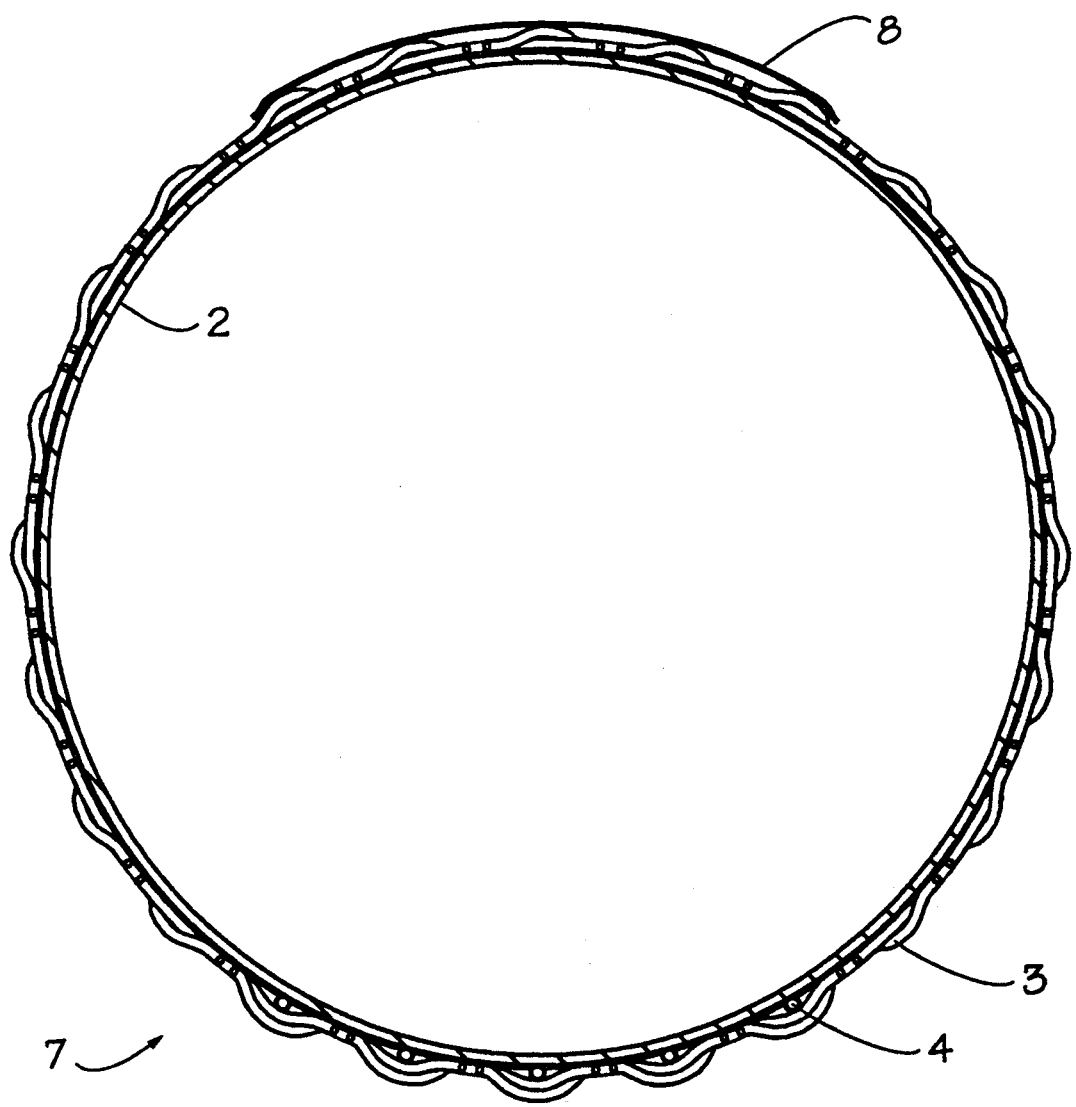
FIG. 5 shows a tube cross section with reinforcing tape bonded to the outside opposite the axial fibers, again for extra stiffness.

FIG. 5 shows the cross section of an inflated, curved tube 7 with its elastomeric inner tube 2 and with reinforcing tape 8 bonded opposite to the axial fibers for added stiffness. The tube is inflated to its design shape at the time the tape is added to the construction.

In any given curved beam the bias angle of the uninflated weave varies with the design curvature at a particular region along the beam. While specific design parameters for a curved, inflatable tubular beam have been presented as the preferred embodiment, the concept is not limited by such. Also, for any given span and load and curvature the actual final setting of the design parameters is determined by the building of test pieces of tube. From this the final design evolves. It is the control of the bias angle in the braid along with the added axial fibers, both to achieve a design with the right strength and shape, which is the invention.

The placement of a gas barrier for the inflated beam can be inside the fibers.

We claim:

1. A curved, inflated, tubular beam of a given length, diameter and radii of curvature, the curvature being contained within a plane, comprising:
   an elastomeric, gas-containable tube extending the length of the beam, the tube having means for the introduction of and holding of gas at a pressure elevated above the surrounding pressure, the tube surrounded by two sets of reinforcing fibers, one set of the fibers being an interlaced pattern of crossing strands, individual strands forming a helix, the helix angle being variable along the tube, the other set of fibers, an axial set, extending among the first set and extending parallel to the axis of the tube, the axial set extending as multiple fibers forming a width of fibers, the width extending partially around the circumference of the tube symmetrically on either side of the intersection of a plane through the tube, the plane being within the plane of curvature, the axial fibers extending the full length of the tube, the axial fibers being centered around the center of an area of the surface of the tube, the area being on the inside of the curvature of the tube, mean for sealing the ends of the tube and for valving the inflation gas.

2. The curved, inflated, tubular beam of claim 1 further comprising the internal pressurization being contained by a bladder of elastomeric film inside the layer of reinforcing fibers.

3. The curved, inflated, tubular beam of claim 1 further comprising the beam being an arc of one constant radius.

4. The curved, inflated, tubular beam of claim 1 further comprising the beam having a variable radius of curvature throughout its length.

5. The curved, inflated, tubular beam of claim 1 further comprising the curved shape of the beam being additionally strengthened by tape, the tape being bonded to the tube on the outside of the tube's curvature.

6. The curved, inflated, tubular beam of claim 1 further comprising the curved shape of the beam being strengthened by a second similar layer of braided and axial fibers bonded to the first layer with the axial fibers of the second layer located opposite the axial fibers of the first layer.

7. The beam of claim 1 further comprising a cured elastomeric material, the material encapsulating and bonding the fibers together.

8. The curved, inflated, tubular beam of a given length, diameter and radii of curvature, the curvature being contained within a plane, comprising:

a tubular shape made up of two sets of reinforcing fibers, one set of the fibers being an interlaced pattern of crossing strands, the individual strands forming a helix, the helix angle being variable along the tube, the other set of fibers, an axial set, extending among the first set and extending parallel to the axis of the tubular shape, the axial set extending as multiple fibers forming a width of fibers, the width extending partially around the circumference of the tubular shape symmetrically on either side of the intersection of a plane through the tubular shape, the plane being within the plane of curvature, the axial fibers extending the full length of the tubular shape, the axial fibers being centered around the center of an area of the surface of the tubular shape, the area being on the inside of the curvature of the tubular shape, a cured elastomeric material, the material encapsulating and bonding the fibers together, the material bridging between the fibers, the bridging being adequate to act as a gas barrier holding the internal pressure of the beam, the beam having means for sealing the ends of the beam and for valving the inflation gas.

* * * * *